US007912310B2

(12) United States Patent
Yu

(10) Patent No.: US 7,912,310 B2
(45) Date of Patent: Mar. 22, 2011

(54) SYSTEM AND METHOD FOR SCALING MULTIPLE CHANNEL AND INTERLACED IMAGES WITH DIFFERENT OFFSETS BETWEEN CHANNELS

(75) Inventor: Yong Yu, Andover, MA (US)

(73) Assignee: Broadcom Corporation, Irvine, CA (US)

( * ) Notice: Subject to any disclaimer, the term of this patent is extended or adjusted under 35 U.S.C. 154(b) by 894 days.

(21) Appl. No.: 11/112,632

(22) Filed: Apr. 22, 2005

(65) Prior Publication Data

US 2005/0259182 A1 Nov. 24, 2005

Related U.S. Application Data

(60) Provisional application No. 60/573,239, filed on May 21, 2004.

(51) Int. Cl.
*G06K 9/40* (2006.01)

(52) U.S. Cl. ........................................................ 382/260

(58) Field of Classification Search .................. 382/260, 382/264; 348/441

See application file for complete search history.

(56) References Cited

U.S. PATENT DOCUMENTS 5,771,317 A * 6/1998 Edgar .......................... 382/260
6,728,317 B1 * 4/2004 Demos ..................... 375/240.21

OTHER PUBLICATIONS

Mo et al., A Timing Recovery for Return Channel of Digital Video Broadcasting, Jun. 18-20, 2002, International Conference on Consumer Electronics, 2002, pp. 294,295.*
Li et al., An Arbitrary Ratio Resizer for MPEG Applications, Aug. 2000, IEEE Tranactions on Consumer Electronics, vol. 46, No. 3, pp. 467-473.*
Li et al. ,Reliable Motion Detection/ Compensation for Interlaced Sequences and Its Applications to Deinterlacing, Feb. 2000, IEEE Transactions on Circuits and Systems for Video Technology, vol. 10, No. 1, pp. 23-29.*

* cited by examiner

*Primary Examiner* — Bhavesh M Mehta
*Assistant Examiner* — Dennis Rosario
(74) *Attorney, Agent, or Firm* — McAndrews, Held & Malloy, Ltd.

(57) ABSTRACT

A system and method that scale a first image to a second image. The scaling factor between the first image and the second image may be used to determine the number of pixels from the first image to be used to produce a pixel of the second image. The number of pixels from the first image may be utilized to pre-compute coefficients of a filter to be applied to the pixels from the first image. The location of the pixels from the first image relative to the pixels of the second image may be utilized to compute the filter coefficients. The coefficients may be computed using a Sinc function. The predetermined coefficients may be organized according to the order in which the pixels from the first image are to be processed to produce the second image.

17 Claims, 4 Drawing Sheets

SYSTEM AND METHOD FOR SCALING MULTIPLE CHANNEL AND INTERLACED IMAGES WITH DIFFERENT OFFSETS BETWEEN CHANNELS

RELATED APPLICATIONS

This patent application makes reference to, claims priority to and claims benefit from U.S. Provisional Patent Application Ser. No. 60/573,239, entitled "System and Method for Scaling Multiple Channel and Interlaced Images with Different Offsets between Channels," filed on May 21, 2004, the complete subject matter of which is hereby incorporated herein by reference, in its entirety.

This application is related to the following applications, each of which is incorporated herein by reference in its entirety for all purposes:

U.S. patent application Ser. No. 11/000,731 filed Dec. 1, 2004;

U.S. patent application Ser. No. 10/963,677 filed Oct. 13, 2004;

U.S. patent application Ser. No. 10/985,110 filed Nov. 10, 2004;

U.S. patent application Ser. No. 10/981,218 filed Nov. 4, 2004;

U.S. patent application Ser. No. 10/965,172 filed Oct. 13, 2004;

U.S. patent application Ser. No. 10/972,931 filed Oct. 25, 2004;

U.S. patent application Ser. No. 10/974,179 filed Oct. 27, 2004;

U.S. patent application Ser. No. 10/974,872 filed Oct. 27, 2004;

U.S. patent application Ser. No. 10/970,923 filed Oct. 21, 2004;

U.S. patent application Ser. No. 10/963,680 filed Oct. 13, 2004;

U.S. patent application Ser. No. 11/013,768 filed Dec. 16, 2004;

U.S. patent application Ser. No. 11/135,929 filed May 23, 2005; and

U.S. patent application Ser. No. 11/000,676 filed Dec. 1, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video systems video/image scaling often creates problems, particularly for systems with interlaced video and multiple channel video/image with sub-sampled components such as, for example, chrominance components.

Additionally, an input video source may support formats with image sizes different from an associated output video device. For example, an input source may be a broadcasting station, and the output video devices may be any one of the many available televisions and monitors available to consumers with different sizes and standards. As a result, for example, smaller images need to be scaled properly to fit the size of the display, since consumers would not want to see an image in a corner of a display device.

Scaling multiple channel or interlaced video/image may create problems when trying to properly align different channel at the correct relative spatial positions. One of the most common image formats is the YCrCb format, where there is a luminance Y component and the chrominance Cr and Cb components. Often, the YCrCb components are encoded in a 4:2:0 format where there is only half as much Cr and Cb components as there are Y components. Also, the Cr and Cb components are not placed on the exact pixel locations; instead, the chrominance components are located at half pixel offsets from the Y components. Simple scaling with such formats results in incorrect alignment, which in turn results in incorrect alignment, which in turn results artifacts and significant degradation of the image quality. This becomes even more problematic when images are in YCrCb 4:2:0 interlaced format.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that scales a first image to a second image. The method may comprise (a) selecting a plurality of pixels from the first image; (b) applying a filter to the selected plurality of pixels to produce an output pixel; and (c) repeating (a) and (b) for all pixels of the first image to produce a plurality of output pixels that make up the second image.

In an embodiment of the present invention, the filter may comprise coefficients, which may have values corresponding to the selected plurality of pixels to which they are applied. The coefficient may be determined using a Sinc function by computing an offset associated with each coefficient; determining the value of the Sinc function at a location that is the offset distance from the center of the Sinc function; and assigning the determined value to the coefficient.

In an embodiment of the present invention, all filters to be applied to all the pixels of the first image may be pre-computed and organized in an order in which the pixels of the first image are to be processed.

The system may comprise at least one processor capable of performing the method that scales a first image to a second image.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention generally relate to a method and system for processing an encoded video stream. More specifically, the present invention relates to scaling video with little or no distortion to the quality of the image. While the following discussion relates to a video system, it should be understood that the present invention may be used in any system where scaling may introduce distortions. Additionally, while the following discusses the method and system in associated with images coded using a 4:2:0 standard, it should be understood that slight modification may be made to accommodate images encoded using any one of the available or future standards.

A video stream may be encoded using an encoding scheme such as the encoder described by U.S. patent application Ser. No. 10/963,677 filed Oct. 13, 2004, entitled “Video Decoder with Deblocker within Decoding Loop.” Accordingly, U.S. patent application Ser. No. 10/963,677 filed Oct. 13, 2004 is hereby incorporated herein by reference in its entirety.

Figure 1:
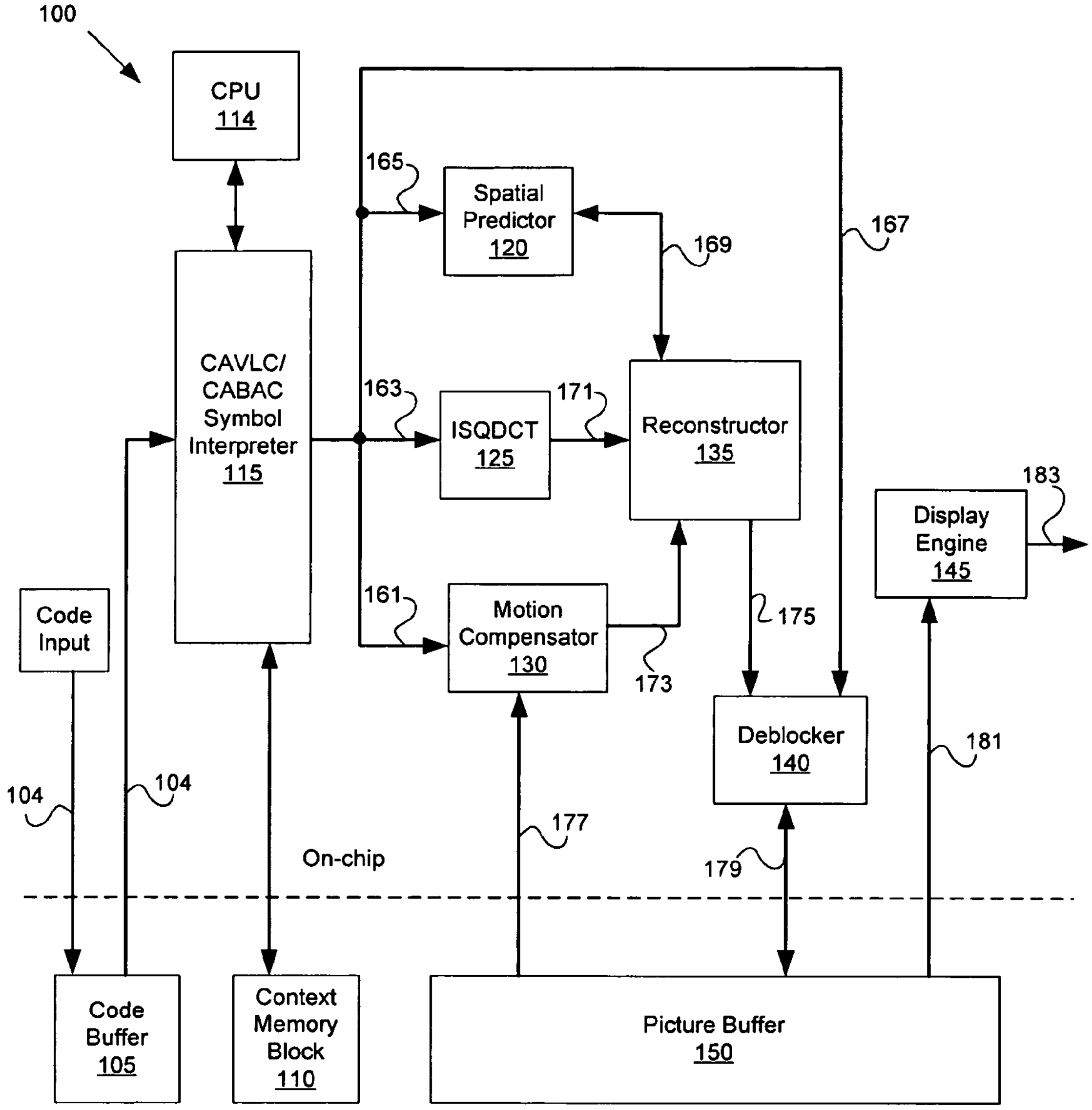
FIG. 1 illustrates a block diagram of an exemplary video decoder, in accordance with an embodiment of the present invention.

FIG. 1 illustrates a block diagram of an exemplary video decoder 100, in accordance with an embodiment of the present invention. The video decoder 100 may comprise a code buffer 105, a symbol interpreter 115, a context memory block 110, a CPU 114, a spatial predictor 120, an inverse scanner, quantizer, and transformer (ISQDCT) 125, a motion compensator 130, a reconstructor 135, a deblocker 140, a picture buffer 150, and a display engine 145.

The code buffer 105 may comprise suitable circuitry, logic and/or code and may be adapted to receive and buffer the video elementary stream 104 prior to interpreting it by the symbol interpreter 115. The video elementary stream 104 may be encoded in a binary format using CABAC or CAVLC, for example. Depending on the encoding method, the code buffer 105 may be adapted to output different lengths of the elementary video stream as may be required by the symbol interpreter 115. The code buffer 105 may comprise a portion of a memory system such as, for example, a dynamic random access memory (DRAM).

The symbol interpreter 115 may comprise suitable circuitry, logic and/or code and may be adapted to interpret the elementary video stream 104 to obtain quantized frequency coefficients information and additional side information necessary for decoding the elementary video stream 104. The symbol interpreter 115 may also be adapted to interpret either CABAC or CAVLC encoded video stream, for example. In an embodiment of the present invention, the symbol interpreter 115 may comprise a CAVLC decoder and a CABAC decoder. Quantized frequency coefficients 163 may be communicated to the ISQDCT 125, and the side information 161 and 165 may be communicated to the motion compensator 130 and the spatial predictor 120, respectively. Depending on the prediction mode for each macroblock associated with an interpreted set of quantized frequency coefficients 163, the symbol interpreter 115 may provide side information either to a spatial predictor 120, if spatial prediction was used during encoding, or to a motion compensator 130, if temporal prediction was used during encoding. The side information 161 and 165 may comprise prediction mode information and/or motion vector information, for example.

In order to increase processing efficiency, a CPU 114 may be coupled to the symbol interpreter 115 to coordinate the interpreting process for each macroblock within the bitstream 104. In addition, the symbol interpreter 115 may be coupled to a context memory block 110. The context memory block 110 may be adapted to store a plurality of contexts that may be utilized for interpreting the CABAC and/or CAVLC-encoded bitstream. The context memory 110 may be another portion of the same memory system as the code buffer 405, or a portion of another memory system, for example.

After interpreting by the symbol interpreter 115, sets of quantized frequency coefficients 163 may be communicated to the ISQDCT 125. The ISQDCT 125 may comprise suitable circuitry, logic and/or code and may be adapted to generate the prediction error E 171 from a set of quantized frequency coefficients received from the symbol interpreter 115. For example, the ISQDCT 125 may be adapted to transform the quantized frequency coefficients 163 back to spatial domain using an inverse transform. After the prediction error E 171 is generated, it may be communicated to the reconstructor 135.

The spatial predictor 120 and the motion compensator 130 may comprise suitable circuitry, logic and/or code and may be adapted to generate prediction pixels 169 and 173, respectively, utilizing side information received from the symbol interpreter 115. For example, the spatial predictor 120 may generate the prediction pixels P 169 for spatially predicted macroblocks, while the motion compensator 130 may generate prediction pixels P 173 for temporally predicted macroblocks. The prediction pixels P 173 may comprise prediction pixels $P_0$ and $P_1$, for example, associated with motion compensation vectors in frames/fields neighboring a current frame/field. The motion compensator 130 may retrieve the prediction pixels $P_0$ and $P_1$ from the picture buffer 150 via the connection 177. The picture buffer 150 may store previously decoded frames or fields.

The reconstructor 135 may comprise suitable circuitry, logic and/or code and may be adapted to receive the prediction error E 171 from the ISQDCT 125, as well as the prediction pixels 173 and 169 from either the motion compensator 130 or the spatial predictor 120, respectively. The pixel reconstructor 135 may then reconstruct a macroblock 175 from the prediction error 171 and the side information 169 or 173. The reconstructed macroblock 175 may then be communicated to a deblocker 140, within the decoder 100.

If the spatial predictor 120 is utilized for generating prediction pixels, reconstructed macroblocks may be communicated back from the reconstructor 135 to the spatial predictor 120. In this way, the spatial predictor 120 may utilize pixel information along a left, a corner or a top border with a neighboring macroblock to obtain pixel estimation within a current macroblock.

The deblocker 140 may comprise suitable circuitry, logic and/or code and may be adapted to filter the reconstructed macroblock 175 received from the reconstructor 135 to reduce artifacts in the decoded video stream. The deblocked macroblocks may be communicated via the connection 179 to the picture buffer 150.

The picture buffer 150 may be adapted to store one or more decoded pictures comprising deblocked macroblocks received from the deblocker 140 and to communicate one or more decoded pictures to the display engine 145 and to the motion compensator 130. In addition, the picture buffer 150 may communicate a previously decoded picture back to the deblocker 140 so that the deblocker may deblock a current macroblock within a current picture.

A decoded picture buffered in the picture buffer 150 may be communicated via the connection 181 to a display engine 145. The display engine may then output a decoded video stream 183. The decoded video stream 183 may be communicated to a video display, for example.

The symbol interpreter 115 may generate the plurality of quantized frequency coefficients from the encoded video stream. The video stream 104 received by the symbol interpreter 115 may be encoded utilizing CAVLC and/or CABAC. In this regard, the symbol interpreter 115 may comprise a CAVLC interpreter and a CABAC interpreter, for example, which may be adapted to interpret CAVLC and/or CABAC-encoded symbols, respectively. After symbol interpretation, the symbol interpreter may communicate quantized frequency coefficients 163 to the ISQDCT 125, and side information 165 and 161 to the spatial predictor 120 and the motion compensator 130, respectively.

Figure 2A:
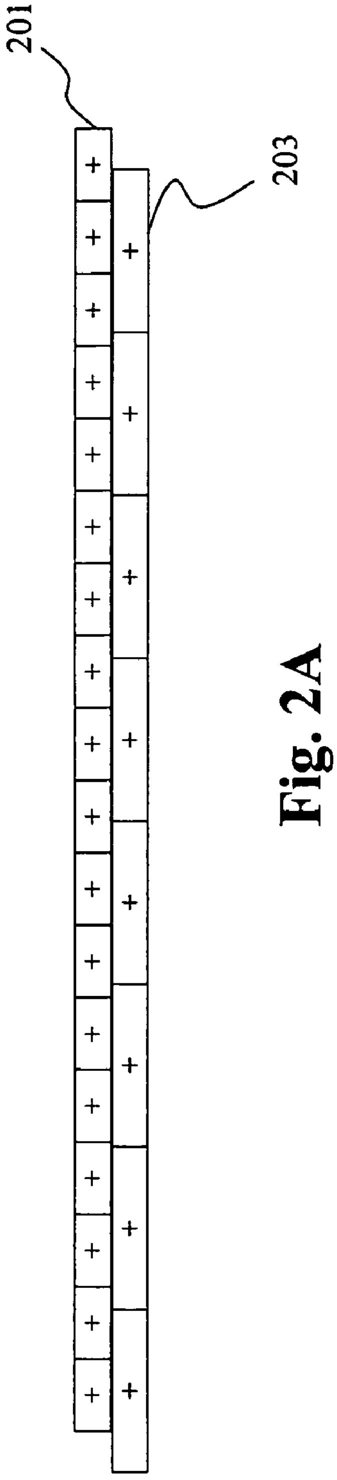
FIG. 2A illustrates an exemplary alignment of the scaled luminance component in a frame, in accordance with an embodiment of the present invention.

In an embodiment of the present invention, multiple channels may be aligned by first scaling the luminance component in a frame in progressive mode, which may be done in a display engine such as, for example, the display engine of FIG. 1. FIG. 2A illustrates an exemplary alignment of the scaled luminance component in a frame, in accordance with an embodiment of the present invention. Pixels 201 may represent the luminance of the pixels from an original frame. Pixels 201 may represent vertical pixels. Pixels 203 may represent the corresponding position for the luminance of the scaled pixels in the scaled frame. For example, the original frame/field pixels 201 may be down-sampled by a factor of 9:4 to achieve the resulting output pixels 203. In this example, to compute the luminance value associated with the first pixel of the pixel 203, i.e., the leftmost pixel, n/2 pixels beyond the boundary of the original image may be extrapolated. A simple extrapolation may be used to replicate the leftmost pixel n/2 times, where n is the number of the taps of the filter.

A n-tap filter may be used to compute the second output pixel using the n associated pixels of the original pixels and so on, to achieve the desired conversion factor such as, for example, the 9:4 factor of original pixels 201 to output pixels 203. The middle of the three taps may be larger such that the middle of the three pixels may contribute more weight to the computation of the output pixel.

Figure 2B:
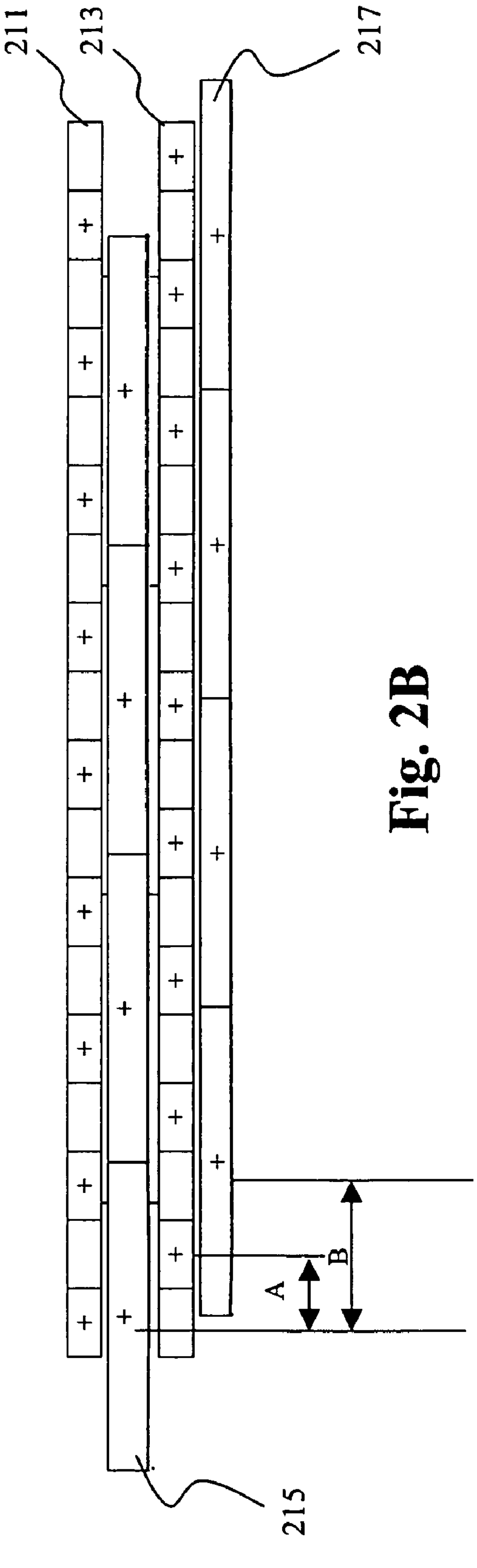
FIG. 2B illustrates an exemplary alignment of the luminance component in a top and bottom field in an interlaced image, in accordance with an embodiment of the present invention.

FIG. 2B illustrates an exemplary alignment of the luminance component in a top and bottom field in an interlaced image, in accordance with an embodiment of the present invention. Pixels 211 and 213 may represent the luminance of the pixels from an original top and bottom field, respectively, and the pixels may represent vertical pixels with the leftmost pixel of pixels 211 representing the first pixel of the original top field. Pixels 215 and 217 may represent the corresponding position for the luminance of the scaled pixels in the scaled top and bottom fields, respectively. The scaled pixels 215 and 217 may be computed as described above in connection with FIG. 2A, using the relevant pixels from the top field 211 to compute the top field 215, and the bottom field 213 to compute the bottom field 217. Using the same example ratio, the original field pixels 211 and 213 may be down-sampled by a factor of 9:4 to achieve the resulting output pixels 215 and 217. The resulting output pixels 215 and 217 may comprise the output top and bottom fields, respectively, and the output pixels may comprise alternating pixels when the two fields are merged during a de-interlacing process. In an embodiment of the present invention, 'A' may be the position offset of the first pixel of the original bottom field from the original top field, and 'B' may be the position offset of the first pixel of the scaled bottom field from the scaled top field, scaled fields. 'A' and 'B' may have the following values:

$$A=\tfrac{1}{2}$$

$$B=\tfrac{1}{2}*(M/N)$$

Where M/N is the scaling factor from the original to the scaled field. In the example above with the 9:4 ratio, M may be 9 and N may be 4.

In an embodiment of the present invention, an offset of the location of each channel/field may be calculated first, in order to align all the channels/fields of an image. The offset may be composed of two parts, an integer and a fraction and may be calculated as follows:

Initial offset=int($B-A+0.5$); //integer pixel shift

Phase offset=($B-A+0.5$)−Initial offset; //fraction part

When scaling, "Initial offset" may indicate the first position in the original frame where the center of the scaling filter is to be located. "Phase offset" may be used to adjust the phase of the filter, and hence the values of the coefficients may be:

Coeff [$i$]=Sinc($i$+phase offset)

In an embodiment of the present invention, an "extended phase" may be used to design a filter with an output that may have any arbitrary delay, and the coefficients of the filter to be organized in an order by which the coefficient sets may be applied in the scaling process. The "extended phase" may reduce the complexity of multiphase filter calculation and eliminate at least one look-up table by providing P sets of coefficients at "extend" phases directly in the order of the applying of the coefficient sets.

Referring to the equations above, the initial offset may be the position (pixel) where the filter is applied at the beginning of each column of pixels. The phase offset may be absorbed by the filter coefficients by displacing the filter by the phase offset. This may be possible since the "extended phase" can be an arbitrary value.

Figure 3:
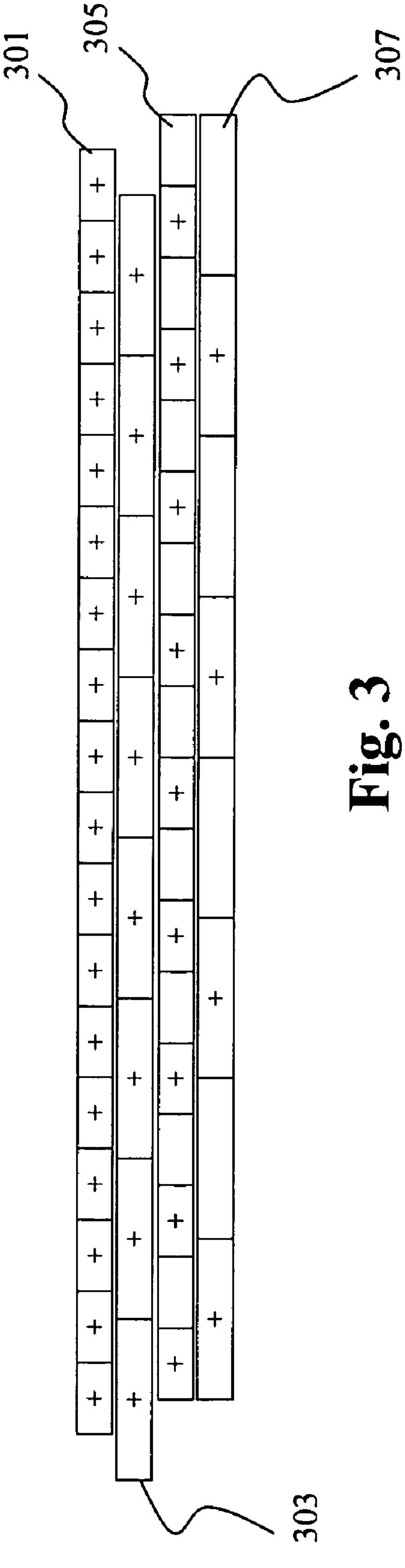
FIG. 3 illustrates an exemplary alignment of the chrominance component with respect to the luminance component in a frame, in accordance with an embodiment of the present invention.

FIG. 3 illustrates an exemplary alignment of the chrominance component with respect to the luminance component in a frame, in accordance with an embodiment of the present invention. In an embodiment of the present invention, the frames may be coded using a 4:2:0 standard. Pixels 301 may represent the luminance of the pixels from an original frame, and they may represent vertical pixels. Pixel 303 may represent the corresponding position for the luminance of the scaled pixels in the scaled frame, computed as described hereinabove. Pixels 305 may represent the chrominance of the pixels from an original frame, and they may represent vertical pixels. Pixel 303 may represent the corresponding position for the chrominance of the scaled pixels in the scaled frame. 'A' and 'B' may have the following values:

$$A=\tfrac{1}{4}$$

$$B=\tfrac{1}{4}*(M/N)$$

The offset may be calculated as follows:

Initial offset=int($B-A+0.5$); //integer pixel shift

Phase offset=($B-A+0.5$)−Initial offset; //fraction part

In an embodiment of the present invention, the frames may be coded using a standard other than 4:2:0, in such an embodiment the values for A and B may be different and the initial offset and phase offset may be changed accordingly.

When scaling, "Initial offset" may indicate the first position in the original frame where the center of the scaling filter is to be located. "Phase offset" may be used to adjust the phase of the filter, and hence the values of the coefficients may be:

$$\text{Coeff}[i]=\text{Sinc}(i+\text{phase offset})$$

Figure 4:
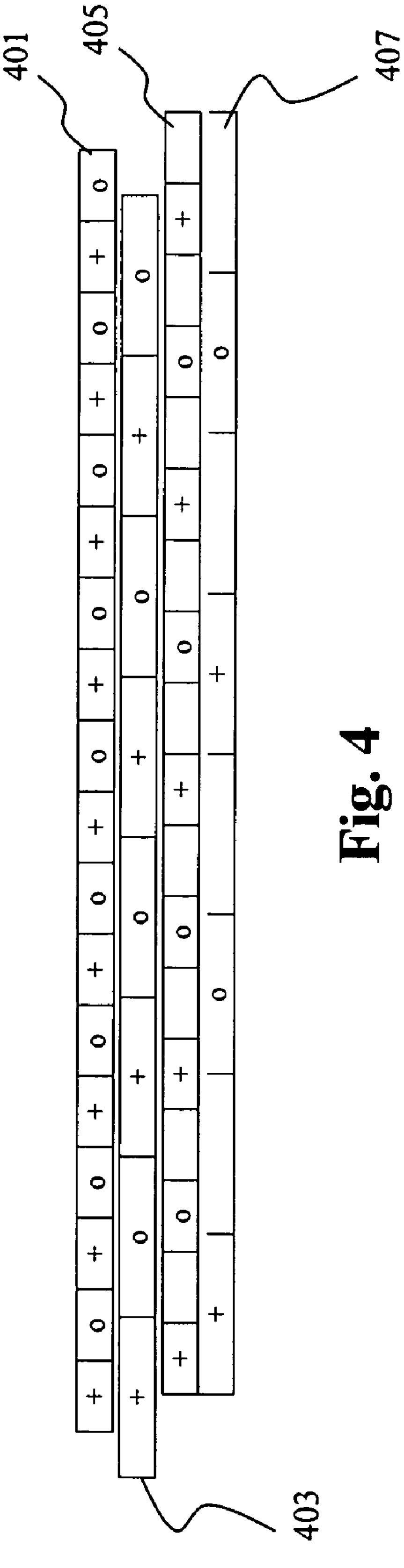
FIG. 4 illustrates an exemplary alignment of the chrominance component with respect to the luminance component in a frame in a progressive image or top and bottom fields in an interlaced image, in accordance with an embodiment of the present invention

FIG. 4 illustrates an exemplary alignment of the chrominance component with respect to the luminance component in a frame in a progressive image or top and bottom fields in an interlaced image, in accordance with an embodiment of the present invention. Pixels 401 may represent the luminance of the pixels from the original frame or the original top and bottom fields, and they may represent vertical pixels. Pixels 403 may represent the corresponding position for the luminance of the pixels in the scaled frame or top and bottom fields. Pixels 405 may represent the chrominance of the pixels from the original frame or the top and bottom fields, and they may represent vertical pixels. Pixel 407 may represent the corresponding position for the chrominance of the pixels in the scaled frame or the top and bottom fields. The pixels of the top field are indicated with '+' while the pixels of the bottom field are indicated with 'o'. The chrominance pixels indicated using '+' correspond to the luminance pixels indicated using '+' and the similarly the chrominance pixels indicated using 'o' correspond to the luminance pixels indicated using 'o'.

'A' and 'B' for the top field, indicated with '+', may have the following values:

$$A=1/8$$

$$B=1/8*(M/N)$$

The offset may be calculated as follows:

Initial offset=int($B-A+0.5$); //integer pixel shift

Phase offset=($B-A+0.5$)−Initial offset; //fraction part

'A' and 'B' for the bottom field, indicated with 'o', may have the following values:

$$A=5/8$$

$$B=5/8*(M/N)$$

The offset may be calculated as follows:

Initial offset=int($B-A+0.5$); //integer pixel shift

Phase offset=($B-A+0.5$)−Initial offset; //fraction part

U.S. patent application Ser. No. 10/963,680 filed Oct. 13, 2004, entitled "System and method for reducing image scaling complexity with flexible scaling factors" discloses a method for calculating coefficients. Accordingly, U.S. patent application Ser. No. 10/963,680 filed Oct. 13, 2004 is hereby incorporated herein by reference in its entirety.

In an embodiment of the present invention, the coefficients and the positions (pixels) where the filter should apply may be calculated by first allocation the centers of the filter. The centers may be used to calculate the increment table and coefficients with a Sinc function as described in U.S. patent application Ser. No. 10/963,680 filed Oct. 13, 2004, entitled "System and method for reducing image scaling complexity with flexible scaling factors." Accordingly, U.S. patent application Ser. No. 10/963,680 filed Oct. 13, 2004 is hereby incorporated herein by reference in its entirety.

In an embodiment of the present invention, the coefficients associated with the filer to be used in computing an output scaled pixel may vary depending on the position of the output pixels. For example, in FIG. 2A the first pixel of the output pixels 203 may utilize a 2-tap filter to get a weighted average of the first two pixels of the input pixels 201, whereas the second pixel of the output pixels 203 may utilize a 3-tap filter to get a weighted average of the second, third, and fourth pixels of the input pixels 201. The number of coefficients, hence the number of filter taps, and the values of the coefficients may vary based on which output pixel is being computed. For example, the second and third output pixels of the output pixels 203 may each utilize a 3-tap filter, but the coefficients for the two filters may be different based on the amount of weight to be associated with each of the input pixels. For the second output pixel, the second, third, and fourth input pixels may be used, and the third input pixel may have the most weight, hence the largest associated coefficient. On the other hand, the third output pixel may utilize the fourth, fifth, and sixth input pixels, and the fourth and fifth pixels may have large associated coefficients and a small coefficient associated with the sixth input pixel, and so on.

In an embodiment of the present invention, the coefficients associated with each pixel may be computed in advance. The sets of coefficients may then be organized in the order in which the pixels of an original image will be processed to produce the pixels of a corresponding output image. For each pixel of an output image there may be a corresponding Sinc function that may be used to produce the corresponding coefficients. The set of coefficients associated with each pixel may be calculated by first determining the center of the Sinc function to be used to determine the coefficients, then using the offsets from the center of the Sinc function associated with each coefficient. The offsets from the center of the associated Sinc function may reflect the weight of each of the input pixels in computer an output pixel.

Figure 5:
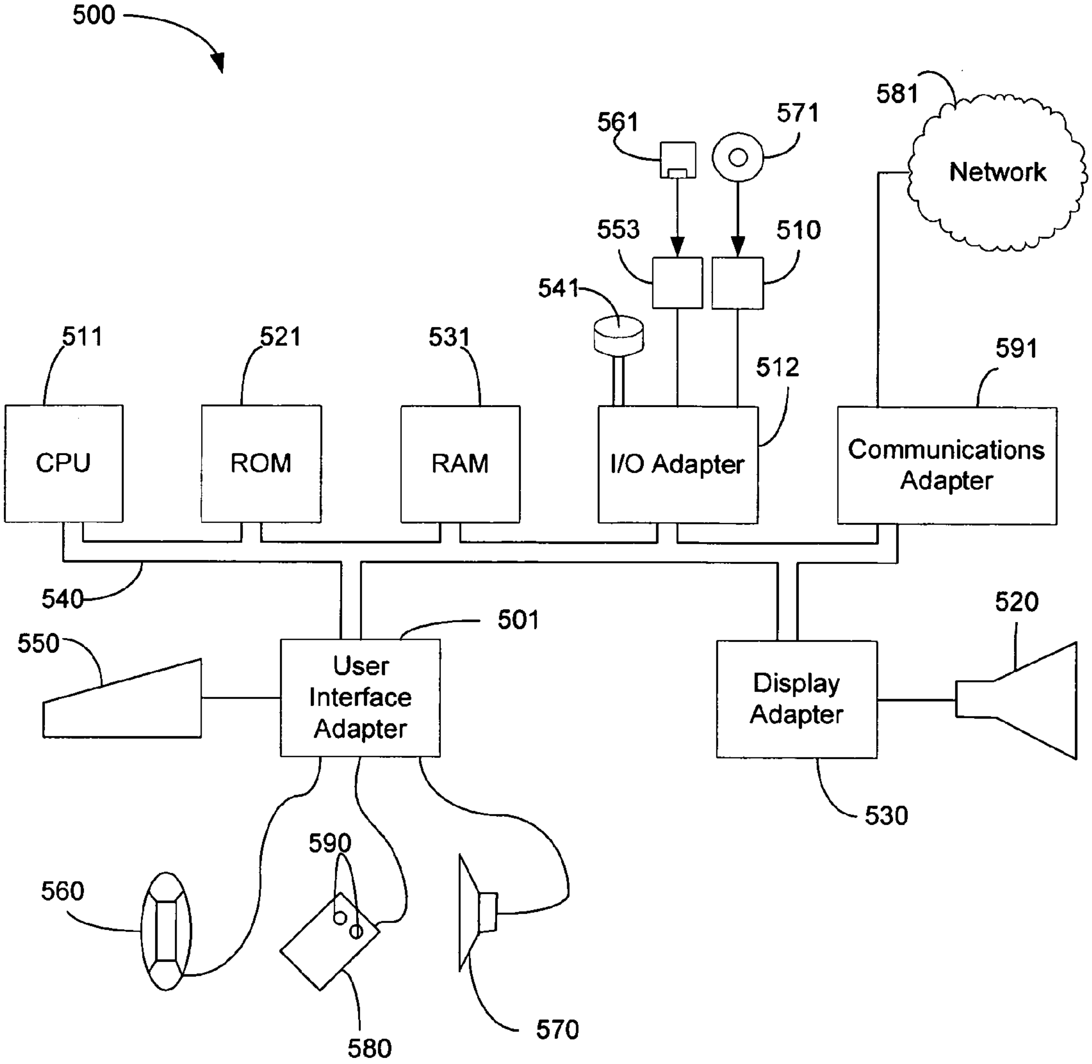
FIG. 5 illustrates an exemplary computer system, in accordance with an embodiment of the present invention

FIG. 5 illustrates an exemplary computer system 500, in accordance with an embodiment of the present invention. A central processing unit (CPU) 511 may be interconnected via a system bus 540 to a random access memory (RAM) 531, a read only memory (ROM) 521, an input/output (I/O) adapter 512, a user interface adapter 501, a communications adapter 591, and a display adapter 530. The I/O adapter 512 may connect to the bus 540 peripheral devices such as hard disc drives 541, floppy disc drives 553 for reading removable floppy discs 561, and optical disc drives 510 for reading removable optical discs 571 (such as a compact disc or a digital versatile disc). The user interface adapter 501 may connect to the bus 540 devices such as a keyboard 550, a mouse 580 having a plurality of buttons 590, a speaker 570, a microphone 560, and/or other user interface devices such as a touch screen device (not shown). The communications adapter 591 may connect the computer system to a data processing network 581. The display adapter 530 may connect a monitor 520 to the bus 540.

An alternative embodiment of the present invention may be implemented as sets of instructions resident in the RAM 531 of one or more computer systems 500 configured generally as described in FIG. 2A, FIG. 2B, FIG. 3, and FIG. 4. Until required by the computer system 500, the sets of instructions may be stored in another computer readable memory, for example in a hard disc drive 541, or in removable memory such as an optical disc 571 for eventual use in an optical disc drive 510, or in a floppy disc 561 for eventual use in a floppy disc drive 553. The physical storage of the sets of instructions may physically change the medium upon which it is stored electrically, magnetically, or chemically so that the medium carries computer readable information.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that scales a first picture to a second picture, the method comprising:

- pre-computing a plurality of filters to be applied to all the pixels of the first image with one or more processors;
- organizing the pre-computed filters in an order in which the pixels of the first image are to be processed;
- (a) selecting a plurality of pixels from the first image;
- (b) applying a particular one of the pre-computed filters to the selected plurality of pixels to produce an output pixel, wherein the particular one of the pre-computed filters is a next filter in the order of the pre-computed filters; and
- (c) repeating (a) and (b) for all pixels of the first image to produce a plurality of output pixels that make up the second image; and
- wherein at least one of the plurality of filters comprise coefficients that are a sinc function of an argument, the argument being a function of at least the distance between a first pixel in a top field of the first image and a first pixel in a bottom field of the first image.

2. The method according to claim 1 is also a function of the desired scaling factor.

3. The method according to claim 2 wherein the desired scaling factor is based on a source of the first picture and a device that processes the second picture.

4. The method according to claim 3 wherein the source of the first picture comprises a broadcasting station.

5. The method according to claim 3 wherein the device that processes the second picture comprises a display device.

6. The method of claim 1, wherein at least another filter of the plurality of filters comprise coefficients that are a sinc function of an argument, the argument being a function of at least the distance between a first pixel in a top field of the second image and a first pixel in a bottom field of the second image.

7. A system that scales a first image to a second image, the system comprising:

- at least one processor capable of pre-computing all of a plurality of filters to be applied to all the pixels of the first image;
- the at least one processor capable of organizing the pre-computed filters in an order in which the pixels of the first image are to be processed;
- (a) the at least one processor capable of selecting a plurality of pixels from the first image;
- (b) the at least one processor capable of applying a filter to the selected plurality of pixels to produce an output pixel; and
- (c) the at least one processor capable of repeating the selecting and applying for all pixels of the first image to produce a plurality of output pixels that make up the second image; and
- wherein at least one of the plurality of filters comprise coefficients that are a sinc function of an argument, the argument being a function of at least the distance between a first luma pixel in the first image in the top row and a first chroma pixel in the first image in the top row.

8. The system according to claim 7 wherein the argument is also a function of a desired scaling factor.

9. The system according to claim 8 wherein the desired scaling factor is based on a source of the first picture and a device that processes the second picture.

10. The system according to claim 9 wherein the source of the first picture comprises a broadcasting station.

11. The system according to claim 9 wherein the device that processes the second picture comprises a display device.

12. The system of claim 7, wherein at least another filter of the plurality of filters comprise coefficients that are a sinc function of an argument, the argument being a function of at least the distance between a first luma pixel in a top field of the first picture and a top chroma pixel in the top field of the first picture.

13. The system of claim 7, wherein at least another filter of the plurality of filters comprise coefficients that are a sinc function of an argument, the argument being a function of at least the distance between a first luma pixel in a bottom field of the first picture and a top chroma pixel in the bottom field of the first picture.

14. The system according to claim 7, wherein the first image is an input image and the second image is an output image.

15. A system that scales a first image to a second image, the system comprising:

- at least one processor capable of pre-computing all of a plurality of filters to be applied to all the pixels of the first image;
- the at least one processor capable of organizing the pre-computed filters in an order in which the pixels of the first image are to be processed;
- (a) the at least one processor capable of selecting a plurality of pixels from the first image;
- (b) the at least one processor capable of applying a filter to the selected plurality of pixels to produce an output pixel; and
- (c) the at least one processor capable of repeating the selecting and applying for all pixels of the first image to produce a plurality of output pixels that make up the second image; and
- wherein at least one of the plurality of filters comprise coefficients that are a sinc function of an argument, the argument being a function of at least the distance between a first luma pixel in the second image and a first chroma pixel in the second image.

16. The system of claim 15, wherein at least another filter of the plurality of filters comprise coefficients that are a sinc function of an argument, the argument being a function of at least the distance between a first luma pixel in a bottom field of the second picture and a top chroma pixel in the bottom field of the second picture.

17. The system of claim 15, wherein at least another filter of the plurality of filters comprise coefficients that are a sinc function of an argument, the argument being a function of at least the distance between a first luma pixel in a top field of the second picture and a top chroma pixel in the top field of the second picture.

* * * * *